(12) United States Patent
Ishikawa et al.

(10) Patent No.: US 11,841,051 B2
(45) Date of Patent: Dec. 12, 2023

(54) TAPERED ROLLER BEARING

(71) Applicant: NTN Corporation, Osaka (JP)

(72) Inventors: Takanori Ishikawa, Shizuoka (JP); Yasuhito Fujikake, Shizuoka (JP)

(73) Assignee: NTN CORPORATION, Osaka (JP)

( * ) Notice: Subject to any disclaimer, the term of this patent is extended or adjusted under 35 U.S.C. 154(b) by 87 days.

(21) Appl. No.: 17/616,474

(22) PCT Filed: Jun. 5, 2020

(86) PCT No.: PCT/JP2020/022321
§ 371 (c)(1),
(2) Date: Dec. 3, 2021

(87) PCT Pub. No.: WO2020/246589
PCT Pub. Date: Dec. 10, 2020

(65) Prior Publication Data
US 2022/0325748 A1 Oct. 13, 2022

(30) Foreign Application Priority Data

Jun. 5, 2019 (JP) ................................. 2019-105147
Jul. 31, 2019 (JP) ................................. 2019-140961
(Continued)

(51) Int. Cl.
*F16C 33/66* (2006.01)
*F16C 19/36* (2006.01)
*F16C 33/46* (2006.01)

(52) U.S. Cl.
CPC ........ *F16C 33/6651* (2013.01); *F16C 19/364* (2013.01); *F16C 33/4635* (2013.01); *F16C 33/4676* (2013.01); *F16C 33/4682* (2013.01)

(58) Field of Classification Search
CPC ............... F16C 19/364; F16C 19/4623; F16C 19/4635; F16C 19/4676; F16C 19/4682; F16C 19/6651
See application file for complete search history.

(56) References Cited

U.S. PATENT DOCUMENTS 6,926,447 B2 *  8/2005  Hamamoto ........... F16C 33/416
                                                    384/527
8,998,498 B2 *  4/2015  Mizuki ............... F16C 33/4682
                                                    384/470
(Continued)

FOREIGN PATENT DOCUMENTS

JP    2-134413    5/1990
JP    2006-2818   1/2006
(Continued)

OTHER PUBLICATIONS

International Search Report dated Sep. 1, 2020, International (PCT) Patent Application No. PCT/JP2020/022321.
(Continued)

*Primary Examiner* — James Pilkington
(74) *Attorney, Agent, or Firm* — Wenderoth, Lind & Ponack, L.L.P.

(57) ABSTRACT

In a tapered roller bearing, a large-diameter-side annular portion includes large-diameter-side pocket surfaces opposed to large end surfaces of respective tapered rollers; and oil retaining recesses each having an opening spanning an inner peripheral surface of the large-diameter-side annular portion and each of the large-diameter-side pocket surfaces. Each of the oil retaining recesses has an inner surface having a radially inwardly facing surface portion which is an inclined surface that is radially inwardly inclined toward the corresponding tapered roller.

20 Claims, 11 Drawing Sheets

(30) Foreign Application Priority Data

Jun. 1, 2020 (JP) ................................. 2020-095380
Jun. 1, 2020 (JP) ................................. 2020-095383

(56) References Cited

U.S. PATENT DOCUMENTS

| | | | |
|---|---|---|---|
| 9,267,543 B2* | 2/2016 | Suzuki | F16C 33/6681 |
| 11,293,484 B2* | 4/2022 | Ishikawa | F16C 19/225 |
| 11,300,155 B2* | 4/2022 | Matsubuchi | F16C 19/364 |
| 2012/0263405 A1 | 10/2012 | Mizuki et al. | |
| 2015/0275974 A1 | 10/2015 | Suzuki | |
| 2021/0054877 A1 | 2/2021 | Zembutsu et al. | |

FOREIGN PATENT DOCUMENTS

| | | | |
|---|---|---|---|
| JP | 2012-87924 | | 5/2012 |
| JP | 2012-112446 | | 6/2012 |
| JP | 2014-152899 | | 8/2014 |
| JP | 5668420 | | 12/2014 |
| JP | 2015-183804 | | 10/2015 |
| WO | WO2019/163809 | * | 8/2019 |
| WO | 2019/172446 | | 9/2019 |

OTHER PUBLICATIONS

International Preliminary Report on Patentability dated Dec. 7, 2021, in International (PCT) Patent Application No. PCT/JP2020/022321.

* cited by examiner

TAPERED ROLLER BEARING

CROSS-REFERENCE TO RELATED APPLICATIONS

This application is a national stage application, filed under 35 U.S.C. § 371, of International Patent Application No. PCT/JP2020/022321, filed on Jun. 5, 2020, which claims priority from Japanese Application No. 2019-105147, filed on Jun. 5, 2019, Japanese Application No. 2020-140961, filed on Jul. 31, 2019, Japanese Application No. 2020-095380, filed on Jun. 1, 2020, and Japanese Application No. 2020-095383, filed on Jun. 1, 2020, each of which is incorporated by reference herein in its entirety.

TECHNICAL FIELD

The present invention relates to a tapered roller bearing.

BACKGROUND ART

Tapered roller bearings, which are capable of supporting radial and axial loads at the same time, are frequently used in automotive transmissions and differential mechanisms.

Such a tapered roller bearing includes an outer ring; an inner ring arranged inwardly of, and coaxially with, the outer ring; a plurality of tapered rollers disposed between the outer ring and the inner ring so as to be circumferentially spaced apart from each other; and an annular cage keeping the circumferential distances between the tapered rollers. The inner ring includes a large flange which comes into contact with the large end surfaces of the tapered rollers. During rotation of the bearing, the large end surfaces of the tapered rollers and the large flange of the inner ring partially support the axial load by coming into sliding contact with each other.

The above tapered roller bearing is lubricated by droplets of lubricating oil splashed due to rotation of gears, or by lubricating oil pressure-fed from an oil pump. While the bearing is rotating, lubricating oil is continuously supplied to the bearing from outside, but, while the bearing is stopped, lubricating oil is not supplied to the tapered roller bearing from outside. Therefore, when the tapered roller bearing is stopped for a long time, most of the lubricating oil adhering to the bearing flows away, and, when the tapered roller bearing is started thereafter, the bearing is less likely to be sufficiently lubricated.

Especially in recent years, in order to reduce energy loss caused by the stirring resistance of lubricating oil, there is a growing tendency to use low-viscosity lubricating oil, or reduce the amount of lubricating oil, in automotive transmissions or differential mechanisms. Therefore, when a tapered roller bearing used therein is stopped for a long time, the amount of lubricating oil remaining in the tapered roller bearing tends to decrease to an insufficient level, and thus, when the tapered roller bearing is started thereafter, the temperature of the bearing between the large end surfaces of the tapered rollers and the large flange of the inner ring may rise sharply.

In order to prevent such a sharp rise in temperature, a tapered roller bearing as shown in FIGS. 11 to 14 of the below-identified Patent Document 1 is known in which, even when the supply of lubricating oil to the tapered roller bearing from outside is stopped, lubrication between the large end surfaces of the tapered rollers and the large flange of the inner ring is possible. The cage of the tapered roller bearing shown in FIGS. 11 to 14 of Patent Document 1 includes a large-diameter-side annular portion circumferentially extending along the large end surfaces of the tapered rollers; a small-diameter-side annular portion circumferentially extending along the small end surfaces of the tapered rollers; and a plurality of pillars coupling together the large-diameter-side annular portion and the small-diameter-side annular portion. The large-diameter-side annular portion has a plurality of oil retaining recesses circumferentially spaced apart from each other. The oil retaining recesses have openings spanning the inner peripheral surface of the large-diameter-side annular portion and its large-diameter-side pocket surfaces. The oil retaining recesses are, when axially seen, bow-shaped recesses each having an inner surface in the form of a single concave circular arc-shaped surface. The large-diameter-side pocket surfaces are opposed to the large end surfaces of the respective tapered rollers.

In the tapered roller bearing of Patent Document 1, while lubricating oil is continuously supplied to the tapered roller bearing from outside, the lubricating oil is partially retained in the oil retaining recesses in the inner periphery of the large-diameter-side annular portion of the cage, and, when the supply of lubricating oil to the tapered roller bearing from outside is stopped thereafter for some reason, lubrication between the large end surfaces of the tapered rollers and the large flange of the inner ring is provided by the lubricating oil flowing out of the oil retaining recesses in the inner periphery of the large-diameter-side annular portion of the cage.

PRIOR ART DOCUMENT(S)

Patent Document(s)

Patent document 1: Japanese Patent No. 5668420

SUMMARY OF THE INVENTION

Problems to be Solved by the Invention

In the tapered roller bearing of Patent Document 1, the bottom surfaces (i.e., the radially inwardly facing surface portions of the inner surfaces) of the oil retaining recesses in the large-diameter-side annular portion of the cage are inclined radially outwardly toward the respective tapered rollers such that, when the lubricating oil in the oil retaining recesses receives a centrifugal force as the bearing rotates, component forces in the direction toward the large end surfaces of the tapered rollers are applied to the lubricating oil in the oil retaining recesses.

However, while the tapered roller bearing is stopped for a long time, the lubricating oil in the oil retaining recesses is moved toward the tapered rollers due to the inclination of the bottom surfaces of the oil retaining recesses, and gradually flows out through the gaps between the large-diameter-side annular portion of cage and the large end surfaces of the tapered rollers. As a result, when the tapered roller bearing is started thereafter, lubrication between the large end surfaces of the tapered rollers and the large flange of the inner ring may be insufficient. This could cause a sharp rise in the temperature of the bearing between the large end surfaces of the tapered rollers and the large flange of the inner ring.

It is an object of the present invention to provide a tapered roller bearing in which, when the tapered roller bearing is started after being stopped for a long time, it is possible to prevent a sharp rise in the temperature of the bearing between the large end surfaces of the tapered rollers and the large flange of the inner ring.

Means for Solving the Problems

In order to achieve the above object, the present invention provides, as its first embodiment, a tapered roller bearing comprising: an outer ring; an inner ring arranged inwardly of, and coaxially with, the outer ring; a plurality of tapered rollers each having a large end surface and a small end surface, and disposed between the outer ring and the inner ring so as to be circumferentially spaced apart from each other; and an annular cage keeping circumferential distances between the tapered rollers, wherein the inner ring includes a large flange configured to come into contact with the large end surfaces of the tapered rollers, wherein the cage includes: a large-diameter-side annular portion circumferentially extending along the large end surfaces of the tapered rollers; a small-diameter-side annular portion circumferentially extending along the small end surfaces of the tapered rollers; and a plurality of pillars coupling together the large-diameter-side annular portion and the small-diameter-side annular portion, wherein the large-diameter-side annular portion, the small-diameter-side annular portion, and the pillars define a plurality of pockets in which the respective tapered rollers are received, and wherein the large-diameter-side annular portion has: large-diameter-side pocket surfaces opposed to the large end surfaces of the respective tapered rollers; and oil retaining recesses each having an opening spanning an inner peripheral surface of the large-diameter-side annular portion and each of the large-diameter-side pocket surfaces, characterized in that each of the oil retaining recesses has an inner surface having a radially inwardly facing surface portion, the radially inwardly facing portion being an inclined surface radially inwardly inclined toward a corresponding one of the tapered rollers.

With this arrangement, the bottom surfaces (i.e., the radially inwardly facing surface portions of the inner surfaces) of the oil retaining recesses located at a lower level than the center axis of the bearing are inclined upwardly toward the tapered rollers. Therefore, when the tapered roller bearing is stopped, the lubricating oil in the oil retaining recesses located at a lower level than the rotational center axis of the tapered roller bearing is less likely to flow out of the oil retaining recesses. Also, when the tapered roller bearing rotates, the lubricating oil in the oil retaining recesses is moved along the inclined surfaces toward the tapered rollers by a centrifugal force, and lubricates the large end surfaces of the tapered rollers. Therefore, when the tapered roller bearing is started after being stopped for a long time, it is possible to effectively prevent a sharp rise in the temperature of the bearing between the large end surfaces of the tapered rollers and the large flange of the inner ring.

The inclined surface of each of the oil retaining recesses is preferably inclined at an inclination angle of 10 degrees or less relative to a direction parallel to a center axis of the cage.

If such an inclination angle is used, the lubricating oil in the oil retaining recesses can suitably lubricate the large end surfaces of the tapered rollers during rotation of the tapered roller bearing, and can be suitably retained in the oil retaining recesses while the tapered roller bearing is stopped. Also, such an inclination angle is feasible by forcible separation of mold parts when molding a resin.

A cross-sectional shape of each of the oil retaining recesses orthogonal to the center axis of the cage is preferably a quadrangular shape.

If the oil retaining recesses have such a cross-sectional shape, lubricating oil is retained at the corners of the oil retaining recesses having a quadrangular cross section by the surface tension of the lubricating oil, and thus is likely to be retained in the oil retaining recesses.

In order to achieve the above object, the present invention also provides, as its second embodiment, a tapered roller bearing comprising: an outer ring; an inner ring arranged inwardly of, and coaxially with, the outer ring; a plurality of tapered rollers each having a large end surface and a small end surface, and disposed between the outer ring and the inner ring so as to be circumferentially spaced apart from each other; and an annular cage keeping circumferential distances between the tapered rollers, wherein the inner ring includes a large flange configured to come into contact with the large end surfaces of the tapered rollers, wherein the cage includes: a large-diameter-side annular portion circumferentially extending along the large end surfaces of the tapered rollers; a small-diameter-side annular portion circumferentially extending along the small end surfaces of the tapered rollers; and a plurality of pillars coupling together the large-diameter-side annular portion and the small-diameter-side annular portion, wherein the large-diameter-side annular portion, the small-diameter-side annular portion, and the pillars define a plurality of pockets in which the respective tapered rollers are received, and wherein the large-diameter-side annular portion includes: large-diameter-side pocket surfaces opposed to the large end surfaces of the respective tapered rollers; and oil retaining recesses each having an opening spanning an inner peripheral surface of the large-diameter-side annular portion and each of the large-diameter-side pocket surfaces, characterized in that, when axially seen, each of the oil retaining recesses has a polygonal shape having two or more corners where adjacent inner surface portions of the oil retaining recess intersect with each other.

With this arrangement, since, at each corner of each oil retaining recess, lubricating oil comes into contact with the adjacent inner surface portions of the oil retaining recess, the lubricating oil is likely to be retained in the oil retaining recess by the surface tension of the lubricating oil. Therefore, it is possible to reduce the outflow of the lubricating oil in the oil retaining recesses due to its own weight while the bearing is stopped, and to keep the lubricating oil in the oil retaining recesses even when the bearing is stopped for a long time. When the tapered roller bearing rotates thereafter, the lubricating oil in the oil retaining recesses is moved toward the tapered rollers by a centrifugal force, and lubricates the roller large end surfaces. This effectively prevents a sharp rise in the temperature of the bearing between the large end surfaces of the tapered rollers and the large flange of the inner ring, when the tapered roller bearing is started after being stopped for a long time.

It is preferable that each of the oil retaining recesses has an inner wall surface located inside of the inner peripheral surface of the large-diameter-side annular portion, into the large-diameter-side annular portion, in cross section orthogonal to a circumferential direction, and the inner wall surface includes an axially recessed oil retaining groove.

With this arrangement, compared to the arrangement in which the entire inner wall surface is flat, the formation of the oil retaining groove in the inner wall surface increases the number of recessed and protruding portions on the inner surface of the oil retaining recess. Therefore, lubricating oil is likely to be retained in the oil retaining recesses due to the surface tension of the lubricating oil. Therefore, the lubricating oil in the oil retaining recesses can suitably lubricate the roller large end surfaces during rotation of the tapered roller bearing, and can be suitably retained in the oil retaining recesses while the tapered roller bearing is stopped.

The oil retaining groove of each of the oil retaining recesses is preferably radially outwardly spaced apart from the inner peripheral surface of the large-diameter-side annular portion so as not to open to the inner peripheral surface of the large-diameter-side annular portion.

With this arrangement, in the oil retaining recesses located at a higher level than the rotational center axis of the tapered roller bearing, the interior lubricating oil is suitably retained by the oil retaining grooves. In other words, for the oil retaining recesses located at a higher level than the above rotational center axis, while gravity (force in the downward direction toward the inner peripheral surface of the large-diameter-side annular portion) is applied to the lubricating oil therein, since the oil retaining grooves of the oil retaining recesses do not open to the inner peripheral surface of the large-diameter-side annular portion, the lubricating oil in the oil retaining grooves does not easily flow out of the oil retaining grooves due to its own weight. Therefore, the lubricating oil in the oil retaining recesses can be suitably retained in the oil retaining recesses by the oil retaining grooves.

The oil retaining groove of each of the oil retaining recesses preferably comprises: a horizontal groove portion extending from one of two opposite circumferential sides to the other circumferential side; and a vertical groove portion branching off and extending radially outwardly from an intermediate section of the horizontal groove portion.

This arrangement increases the surface area of the inner surface of the oil retaining groove of each oil retaining recess, thus increasing the contact area between the lubricating oil in the oil retaining recess and the inner surface of the oil retaining groove. As a result, a larger surface tension acts between the lubricating oil in the oil retaining groove and the inner surface of the oil retaining groove. Therefore, the lubricating oil in the oil retaining recess can be retained more suitably in the oil retaining recess.

It is preferable that the two or more corners of the polygonal shape, as seen axially, of each of the oil retaining recesses include two or more acute corners, and, along each of the two or more acute corners, the adjacent inner surface portions of the oil retaining recess intersect with each other at an angle of 90 degrees or less.

With this arrangement, at each corner of each oil retaining recess via which the adjacent inner surface portions of the oil retaining recess intersect with each other at an angle of not more than 90 degrees, lubricating oil easily comes into contact with the adjacent surface portions. Therefore, at such a corner, the contact area between the lubricating oil in, and the inner surface of, the oil retaining recess becomes larger. This increases the surface tension acting between the lubricating oil in, and the inner surface of, the oil retaining recess, so that the lubricating oil in the oil retaining recess can be more suitably retained in the oil retaining recess.

At each of the corners, the adjacent inner surface portions preferably intersect with each other via a rounded surface having a radius of curvature of preferably 1.0 mm or less, at least 2.0 mm or less.

With this arrangement, since the corner of each oil retaining recess are rounded surfaces where the adjacent inner surface portions of the oil retaining recess intersect with each other, it is possible to reduce stress concentration on the corners during rotation of the bearing, and also to improve the formability of the oil retaining recesses. Also, since such rounded surfaces have a radius of curvature of 1.0 mm or less, at least 2.0 mm or less, it is possible to more reliably reduce stress concentration on the corners during rotation of the bearing.

In each of the first and second embodiments, two or more of the oil retaining recesses are preferably circumferentially arranged between each circumferentially adjacent pair of the pillars.

With this arrangement, the total area of the inner surfaces of the oil retaining recesses is larger than in an arrangement in which a single oil retaining recess is disposed between each circumferentially adjacent pair of pillars. This increases the contact area between the lubricating oil in the oil retaining recesses and the inner surfaces of the oil retaining recesses, thereby increasing the surface tension acting between the inner surfaces of the oil retaining recesses and the lubricating oil. Thus, a sufficient amount of lubricating oil can be retained in the oil retaining recesses.

Also, in each of the first and second embodiments, if each of the tapered rollers has a recess in the large end surfaces thereof, the two or more of the oil retaining recesses are preferably disposed on both sides of the recess of a corresponding one of the tapered rollers.

With this arrangement, while the tapered roller bearing is stopped, it is possible to prevent the lubricating oil retained in the oil retaining recesses from flowing into the recesses of the large end surfaces of the tapered rollers. Thus, it is possible to lubricate the large end surfaces of the tapered rollers, while reducing the friction between the tapered rollers and the large flange of the inner ring.

Also, in each of the first and second embodiments, it is preferable that the opening of each of the oil retaining recesses has a first portion open to a corresponding one of the large-diameter-side pocket surfaces, the first portion having a second portion opposed to a corresponding one of the large end surfaces of the tapered rollers, and an area of the second portion accounts for 50% or more of an area of the first portion.

With this arrangement, since 50% or more of the area of the first portion is opposed to the large end surface of the tapered roller, most of the lubricating oil flowing out of the oil retaining recess through the opening thereof open to the large-diameter-side pocket surface can be efficiently adhered to the large end surface of the tapered roller, thus making it possible to effectively lubricate the large end surfaces of the tapered rollers.

Also, in each of the first and second embodiments, each of the oil retaining recesses is preferably located inside of a peripheral edge of the corresponding one of the large end surfaces of the tapered rollers so as not to protrude to outside of an area opposed to the corresponding one of the large end surfaces.

If the oil retaining recesses are located as described above, the lubricating oil retained in the oil retaining recesses can be efficiently supplied to the roller large end surfaces, and can effectively contribute to lubrication between the inner ring large flange and the roller large end surfaces.

Also, in each of the first and second embodiments, the inner ring includes a small flange opposed to the small end surfaces of the tapered rollers, and, if the cage is integrally formed of a resin composition, the resin composition preferably comprises a resin material to which an elastomer is added.

The reason is described below. The tapered roller bearing can be assembled as follows: First, the tapered rollers are inserted into the respective pockets of the cage. Next, the inner ring is inserted into the cage with the tapered rollers received in the respective pockets of the cage. At this time, the tapered rollers need to move over the small flange of the inner ring. However, since the movements of the tapered rollers in the radially outward direction are restricted by the cage, the tapered rollers cannot move over the small flange in the original-dimension relationship. In order to allow the tapered rollers to move over the small flange, if the cage is integrally formed of a resin composition, the cage needs to be elastically deformed by the radially expanding forces which the tapered rollers receive from the small flange when the tapered rollers move onto the small flange. If a resin material to which an elastomer is added is used as the resin composition forming the cage, the elasticity of the cage increases. Therefore, it is possible to easily insert the inner ring into the cage with the tapered rollers received in the respective pockets of the cage, and thus to easily assemble the tapered roller bearing.

A reinforcing fiber material is further added to the resin material.

If a reinforcing fiber material is added, a reduction in toughness and strength of the cage due to the addition of the elastomer can be compensated for by the reinforcing fiber material added. Therefore, it is possible to realize both high toughness and strength of the cage and ease of assembly of the tapered roller bearing.

Effects of the Invention

If the tapered roller bearing of the first embodiment is used, since the bottom surfaces (i.e., the radially inwardly facing surface portions of the inner surfaces) of the oil retaining recesses located at a lower level than the center axis of the bearing are inclined upwardly toward the tapered rollers, when the tapered roller bearing is stopped, the lubricating oil in the oil retaining recesses located at a lower level than the rotational center axis of the tapered roller bearing is less likely to flow out of the oil retaining recesses. Also, when the tapered roller bearing rotates, the lubricating oil in the oil retaining recesses is moved along the inclined surfaces toward the tapered rollers by a centrifugal force, and lubricates the large end surfaces of the tapered rollers. Therefore, when the tapered roller bearing is started after being stopped for a long time, it is possible to effectively prevent a sharp rise in the temperature of the bearing between the large end surfaces of the tapered rollers and the large flange of the inner ring.

In the tapered roller bearing of the second embodiment, since, at each corner of each oil retaining recess, lubricating oil comes into contact with the adjacent inner surface portions of the oil retaining recess, the lubricating oil is likely to be retained in the oil retaining recess by the surface tension of the lubricating oil. Therefore, it is possible to reduce the outflow of the lubricating oil in the oil retaining recesses due to its own weight while the bearing is stopped, and to keep the lubricating oil in the oil retaining recesses even when the bearing is stopped for a long time. When the tapered roller bearing rotates thereafter, the lubricating oil in the oil retaining recesses is moved toward the tapered rollers by a centrifugal force, and lubricate the roller large end surface. This effectively prevents a sharp rise in the temperature of the bearing between the large end surfaces of the tapered rollers and the large flange of the inner ring, when the tapered roller bearing is started after being stopped for a long time.

BRIEF DESCRIPTION OF THE DRAWINGS

FIG. 6 is used.

FIG. 6 is used.

BEST MODE FOR CARRYING OUT THE INVENTION

Figure 1:
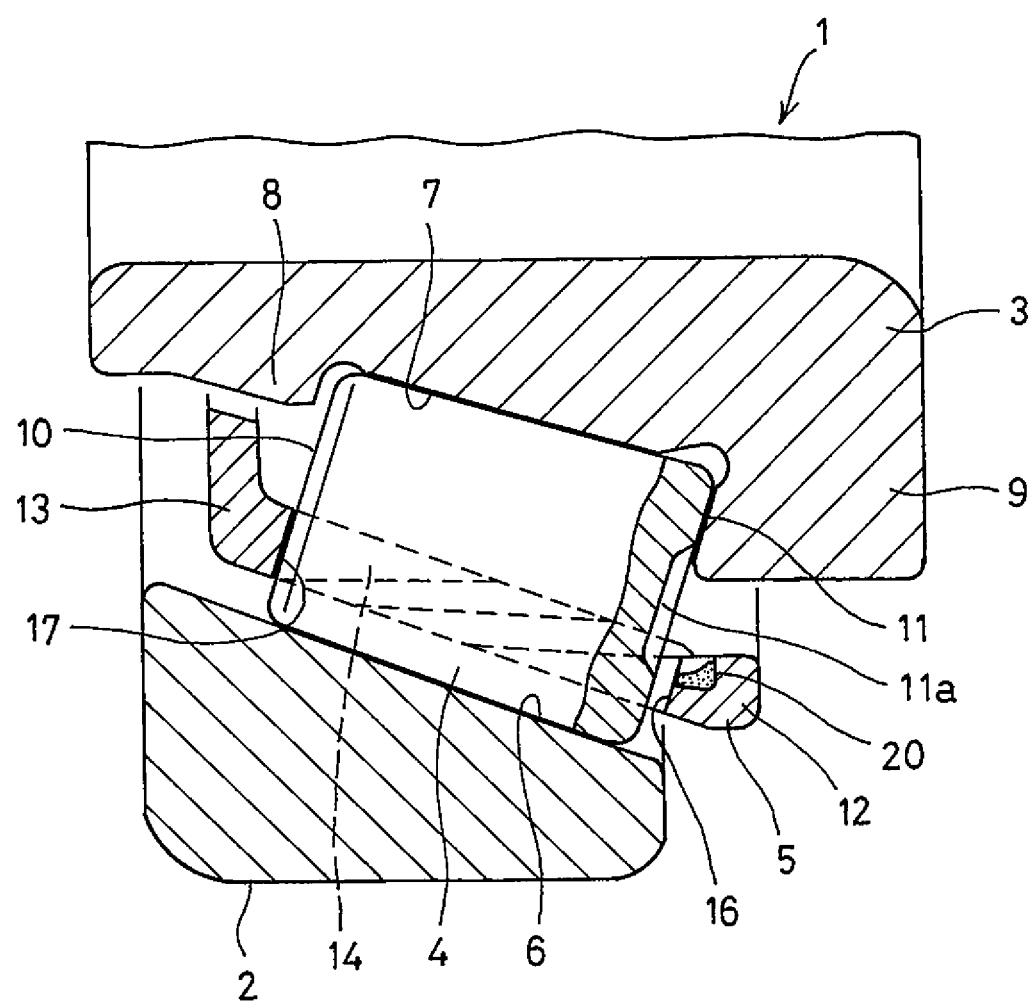
FIG. 1 is a sectional view of a tapered roller bearing according to the first embodiment of the present invention taken along an axial plane.

FIG. 1 illustrates a tapered roller bearing 1 according to the first embodiment of the present invention. The tapered roller bearing 1 includes an outer ring 2; an inner ring 3 arranged inwardly of, and coaxially with, the outer ring 2; a plurality of tapered rollers 4 disposed between the outer ring 2 and the inner ring 3 so as to be circumferentially spaced apart from each other; and an annular cage 5 keeping the circumferential distances between the tapered rollers 4. The tapered roller bearing 1 has a size suitable for use in automobiles. For example, the inner diameter of the inner ring 3 may be 50 mm or less (or may be 35 mm or less).

The outer ring 2 has a tapered outer ring raceway surface 6 on its inner periphery. The inner ring 3 has, on its outer periphery, a tapered inner ring raceway surface 7 radially opposed to the outer ring raceway surface 6, and includes a small flange 8 located on the small-diameter side of the inner ring raceway surface 7, and a large flange 9 located on the large-diameter side of the inner ring raceway surface 7. The tapered rollers 4 are in rolling contact with the outer ring raceway surface 6 and the inner ring raceway surface 7.

The small flange 8 protrudes radially outwardly beyond the inner ring raceway surface 7 so as to be opposed to the small end surfaces 10 of the tapered rollers 4. The small flange 8 restricts movements of the tapered rollers 4 toward the small-diameter side of the inner ring raceway surface 7, and prevents the tapered rollers 4 from falling off from the inner ring raceway surface 7. The large flange 9 protrudes radially outwardly beyond the inner ring raceway surface 7 so as to be opposed to the large end surfaces 11 of the tapered rollers 4. During rotation of the bearing, the large end surfaces 11 of the tapered rollers 4 and the large flange 9 of the inner ring 3 partially support the axial load by coming into sliding contact with each other.

Figure 2:
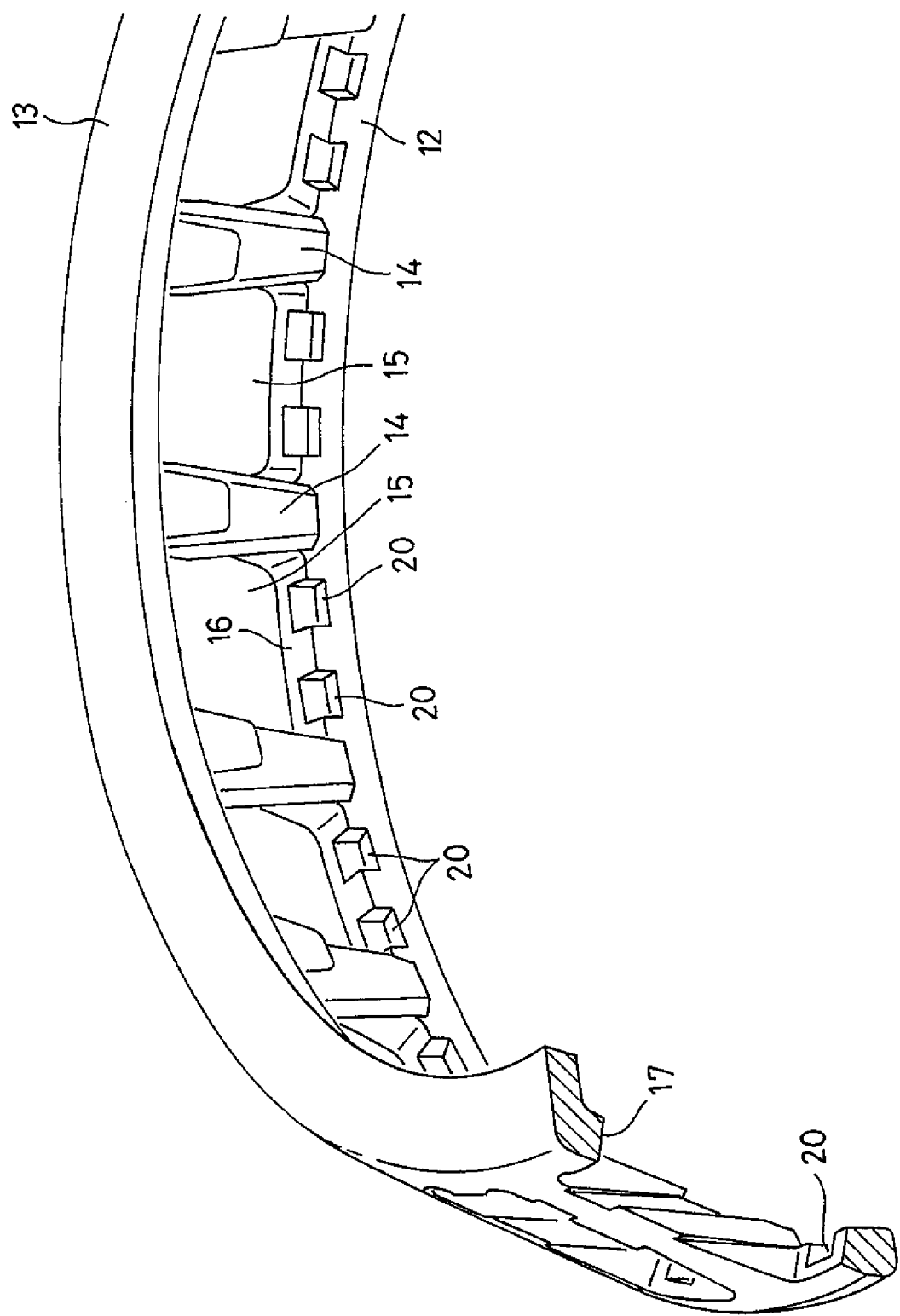
FIG. 2 is a perspective view of the cage of FIG. 1.

As illustrated in FIGS. 1 and 2, the cage 5 includes a large-diameter-side annular portion 12 circumferentially extending along the large end surfaces 11 of the tapered rollers 4; a small-diameter-side annular portion 13 circumferentially extending along the small end surfaces 10 of the tapered rollers 4; and a plurality of pillars 14 extending between the respective circumferentially adjacent pairs of tapered rollers 4 so as to couple together the large-diameter-side annular portion 12 and the small-diameter-side annular portion 13.

The large-diameter-side annular portion 12, the small-diameter-side annular portion 13, and the pillars 14 define a plurality of pockets 15 in which the respective tapered rollers 4 are received. More specifically, the large-diameter-side annular portion 12 and the small-diameter-side annular portion 13 define both ends, in the axial direction of the cage, of the pockets 15, and the respective adjacent pairs of pillars 14 define both ends, in the circumferential direction of the cage, of the pockets 15. The large-diameter-side annular portion 12 has large-diameter-side pocket surfaces 16 opposed to the large end surfaces 11 of the respective tapered rollers 4. The small-diameter-side annular portion 13 has small-diameter-side pocket surfaces 17 opposed to the small end surfaces 10 of the respective tapered rollers 4. The large-diameter-side pocket surfaces 16 are inclined relative to the direction orthogonal to the axial direction of the cage 5 (vertical direction in FIG. 1) so as to be able to come into surface contact with the large end surfaces 11 of the respective tapered rollers 4. Each pillar 14 has roller guiding surfaces opposed to, and configured to come into contact with, the outer peripheries of the corresponding tapered rollers 4, respectively.

The large-diameter-side annular portion 12 includes, in its inner periphery, a plurality of oil retaining recesses 20 spaced apart from each other in the circumferential direction of the cage. The oil retaining recesses 20 span the inner periphery of the large-diameter-side annular portion 12 and the large-diameter-side pocket surfaces 16. In other words, the oil retaining recesses 20 open to both the inner periphery of the large-diameter-side annular portion 12 and the large-diameter-side pocket surfaces 16. The portion of the opening of each oil retaining recess 20 open to the inner periphery of the large-diameter-side annular portion 12 has a rectangular shape when seen from the radially inner side of the cage. The portion of the opening of the oil retaining recess 20 open to the large-diameter-side pocket surface 16 has a rectangular shape when seen in the axial direction.

Figure 3:
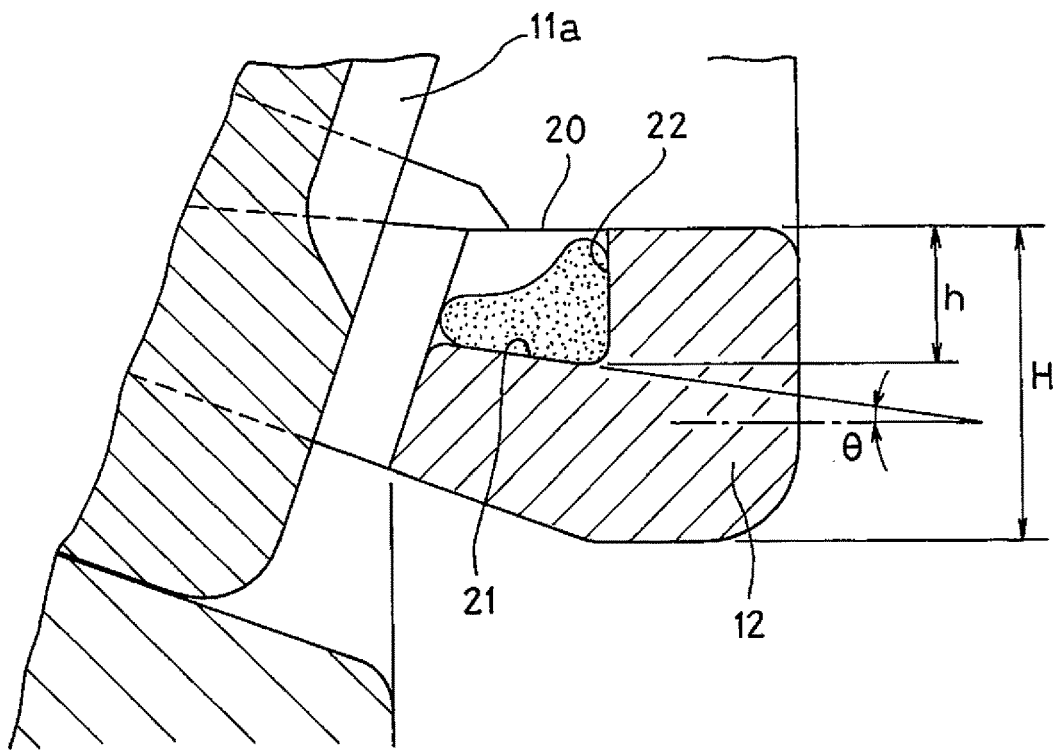
FIG. 3 is a partial enlarged view illustrating an oil retaining recess of FIG. 1 and its vicinity.

As illustrated in FIG. 3, the inner surface of each oil retaining recess 20 comprises a bottom surface 21 facing radially inwardly; and an inner wall surface 22 rising radially inwardly from the peripheral edge of the bottom surface 21 to the opening edge of the oil retaining recess 20. The bottom surface 21 is an inclined surface radially inwardly inclined toward the tapered roller 4. In other words, the radial depth of the oil retaining recess 20 gradually increases in a direction axially away from the portion of the opening of the oil retaining recess at the large-diameter-side pocket surface 16. The inclination angle θ of the bottom surface 21 relative to the direction parallel to the center axis of the cage 5 is larger than 0 degrees, and not more than 10 degrees (preferably 5 degrees or more and 10 degrees or less).

Figure 5:
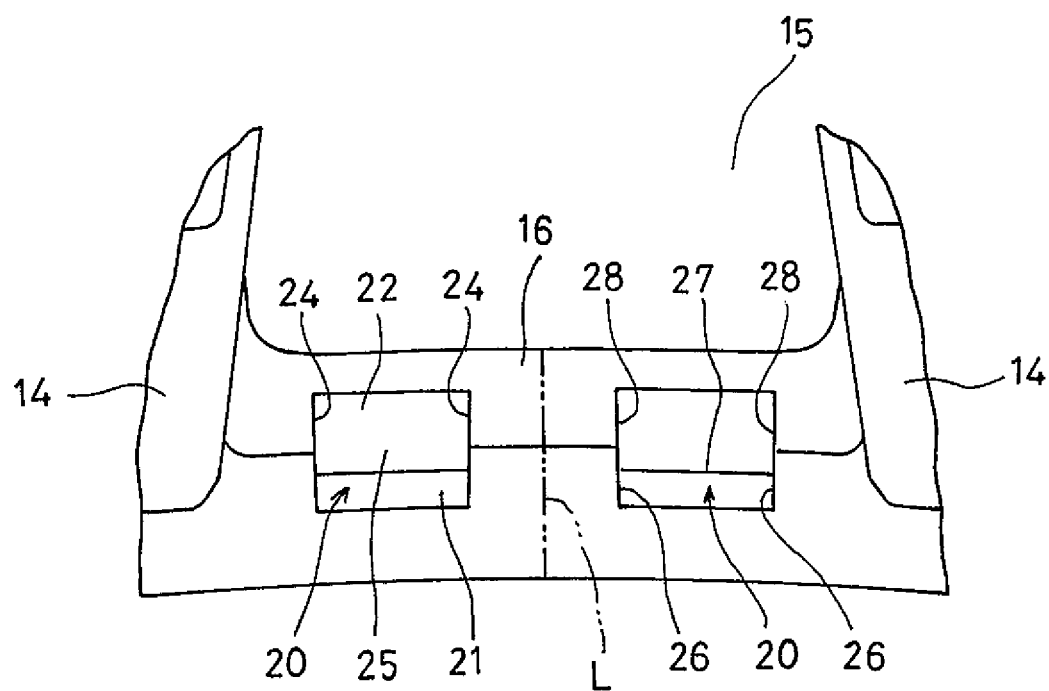
FIG. 5 is a partial enlarged view illustrating the details of oil retaining recesses of FIG. 1 and their vicinities.

As illustrated in FIG. 5, the inner wall surface 22 is composed of a pair of opposed surfaces 24 opposed to each other in the circumferential direction of the cage; and a coupling surface 25 that couples together one end of one of the opposed surfaces 24 and one end of the other of the opposed surfaces 24. The coupling surface 25 is a rising surface axially facing the large end surface 11 of the tapered roller 4. The coupling surface 25 and each of the opposed surfaces 24 intersect directly with each other, or intersect with each other via a rounded corner having a small radius of curvature (e.g., a radius of curvature of 0.5 mm or less). The bottom surface 21 and each of the opposed surfaces 24 also intersect directly with each other, or intersect with each other via a rounded corner having a small radius of curvature (e.g., a radius of curvature of 0.5 mm or less). The coupling surface 25 and the bottom surface 21 also intersect directly with each other, or intersect with each other via a rounded corner having a small radius of curvature (e.g., a radius of curvature of 0.5 mm or less). The cross-section of the oil retaining recess 20 orthogonal to the center axis of the cage 5 is quadrangular in shape, and the cross-section of the oil retaining recess 20 orthogonal to the radial direction is also quadrangular in shape. Therefore, (concave corners 26 are formed between the bottom surface 21 and the respective opposed surfaces 24; a concave corner 27 is formed between the bottom surface 21 and the coupling surface 25; and concave corners 28 are formed between the coupling surface 25 and the respective opposed surfaces 24.

The depth of the oil retaining recess 20 (i.e., the distance from the deepest portion of the oil retaining recess 20 to the radially inner surface of the large-diameter-side annular portion 12) is within the range of 0.2 to 2.0 mm (preferably 0.3 to 1.0 mm), or satisfies the relation 0.2<h/H<0.7, of which "H" and "h" are shown in FIG. 3. At a value smaller than the lower limit of the above h/H range, the oil retaining effect is too small, whereas, at a value larger than the upper limit thereof, strength could be insufficient.

Each tapered roller 4 has a recess 11a in the center of the large end surface 11. The large end surface 11 is constituted by the recess 11a, and an annular surface 11b surrounding the recess 11a. The annular surface 11b is configured to be pressed against the large flange 9. The annular surface 11b is a spherical surface having a sufficiently large radius of curvature (i.e., at least larger than the radius of the inner ring 3). Two or more of the oil retaining recesses 20 are disposed on both sides of each recess 11a (i.e., located across each recess 11a from each other). The recess 11a has a circular opening at the large end surface 11, and is axially recessed from this opening toward the small end surface of the tapered roller.

Figure 4:
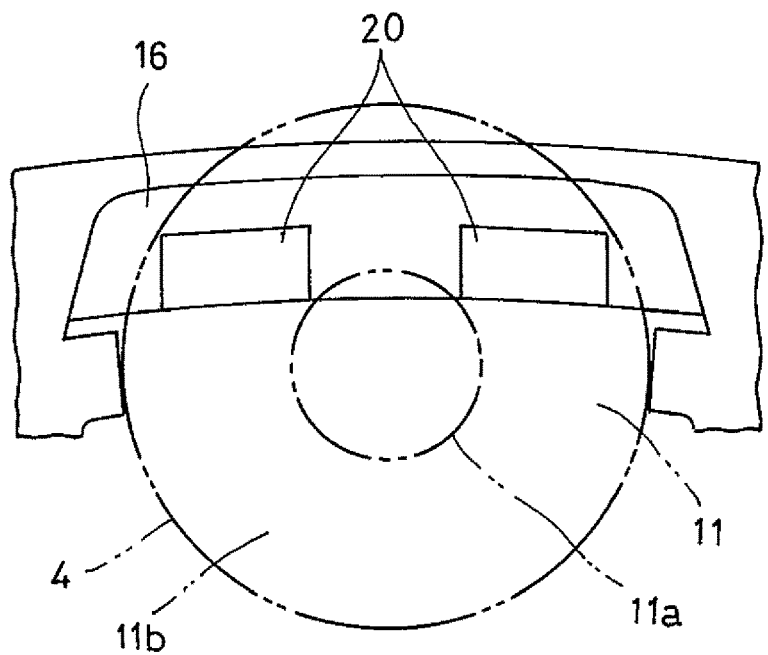
FIG. 4 is a partial sectional view of the cage of FIG. 1 when seen from the side of the large end surface of a tapered roller.

Two or more of the oil retaining recesses 20 are circumferentially arranged between each circumferentially adjacent pair of pillars 14. That is, two or more of the oil retaining recesses 20 are provided per large-diameter-side pocket surface 16. In the example of FIGS. 4 and 5, two of the oil retaining recesses 20 are disposed per large-diameter-side pocket surface 16. The two oil retaining recesses 20 are spaced apart from the center of the large-diameter-side pocket surface 16 to both sides thereof in the circumferential direction of the cage. In other words, the two oil retaining recesses 20 are disposed, respectively, on the right and left sides (in FIG. 4) of the recess 11a of the roller large end surface 11. The two oil retaining recesses 20 are disposed outside of the recess 11a of the roller large end surface 11 so as to be opposed only to the annular surface 11b of the large end surface 11, and not to the recess 11a thereof.

The oil retaining recesses 20 (of each pocket surface 16) are located inside of the peripheral edge of the large end surface 11 of the tapered roller 4 so as not to each protrude to the outside of the area opposed to the large end surface 11. In other words, as illustrated in FIG. 4, in plan view from the side of the large end surface 11, the entire areas of the oil retaining recesses 20 inside of their opening edges are located inside of the peripheral edge of the large end surface 11. Also, the oil retaining recesses 20 are disposed not to protrude into the inside of the opening edge of the recess 11a of the large end surface 11. In other words, in plan view from the side of the large end surface 11, the entire areas of the oil retaining recesses 20 inside of their opening edges are located outside of the opening edge of the recess 11a of the large end surface 11.

The large-diameter-side annular portion 12 has a weld line (or weld line) L (which is formed where, when the cage 5 is formed of a resin, flows of the resin meet). The weld line (or weld lines) L is formed between an adjacent pair of the oil retaining recesses 20. By forming the weld line (or lines) L at this location, it is possible to ensure a sufficient wall thickness of the large-diameter-side annular portion 12, and to form the oil retaining recesses 20 without causing a large reduction in strength, compared to the arrangement where a weld line (or lines) L overlaps with an oil retaining recess 20.

The cage 5 is seamlessly and integrally formed of a synthetic resin. In other words, the large-diameter-side annular portion 12, the small-diameter-side annular portion 13, and the pillars 14, which constitute the cage 5, are seamlessly and integrally formed of a resin composition. The resin composition forming the cage 5 may be composed only of a resin material, but, in the embodiment, a resin material containing an elastomer and a reinforcing fiber material is used.

The resin material (base material) of the resin composition may be a polyamide (PA) such as polyamide 66 (PA66), polyamide 46 (PA46), or polynonamethylene terephthalamide (PA9T). If a polyamide is used, because of its relatively high lipophilicity, lubricating oil shows high wettability with the inner surfaces of the oil retaining recesses 20 of the cage, and thus can be effectively retained in the oil retaining recesses 20 by the surface tension of the lubricating oil. Instead of a polyamide, for example, polyphenylene sulfide (PPS) or polyether ether ketone (PEEK) may be used. The elastomer added to the resin material is, e.g., a thermoplastic elastomer.

As the reinforcing fiber material added to the resin material, for example, glass fiber, carbon fiber or aramid fiber can be used. If glass fiber is used as the reinforcing fiber material, the content of the glass fiber in the fiber-reinforced material is 10 to 50% by mass (preferably 20 to 40% by mass, more preferably 25 to 35% by mass). The kinds of the resin material, elastomer and reinforcing fiber material can be combined freely.

Figure 16:
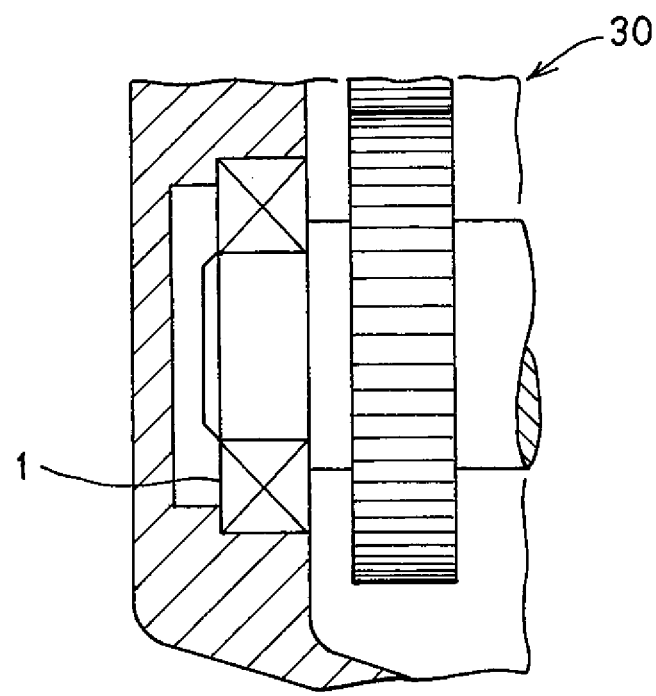
FIG. 16 is a view of a transmission in which the tapered roller bearing of FIG. 1

FIG. 16 shows a structural view of a portion of an automotive transmission 30 in which the above tapered roller bearing 1 is mounted.

Especially in recent years, in order to reduce energy loss caused by the stirring resistance of lubricating oil, there is a growing tendency to use low-viscosity lubricating oil, or reduce the amount of lubricating oil, in automotive transmissions and differential mechanisms. Therefore, when a conventional tapered roller bearing is stopped for a long time, the amount of lubricating oil remaining in the tapered roller bearing tends to decrease to an insufficient level. As a result, when the tapered roller bearing is started thereafter, the temperature of the bearing between the large end surfaces of the tapered rollers and the large flange of the inner ring may rise sharply.

The tapered roller bearing 1 of this embodiment overcomes this problem as follows: While the tapered roller bearing 1 is rotating, lubricating oil is introduced into the oil retaining recesses 20. Since, as described above, the bottom surfaces 21 of the oil retaining recesses 20 are radially inwardly inclined toward the corresponding tapered rollers 4. Thus, while the tapered roller bearing 1 is stopped, the lubricating oil in each oil retaining recess 20 receives, due to gravity, a force that tends to cause the lubricating oil to flow along the inclination of the bottom surface 21 of the oil retaining recess 20 into its deep portion. Therefore, even when the tapered roller bearing 1 is stopped for a long time, lubricating oil remains in the oil retaining recesses 20 of the cage, and is less likely to flow out of the oil retaining recesses 20. When the tapered roller bearing 1 is started thereafter, a centrifugal force acts on the lubricating oil in the oil retaining recesses 20, so that the lubricating oil moves toward the tapered rollers 4 along the inclinations of the bottom surfaces 21, flows out of the oil retaining recesses 20, and is supplied to the large end surfaces 11 of the tapered rollers 4. Therefore, when the tapered roller bearing 1 is started after being stopped for a long time, it is possible to effectively prevent a sharp rise in the temperature of the bearing between the large end surfaces 11 of the tapered rollers 4 and the large flange 9 of the inner ring 3.

Also, in this tapered roller bearing 1, since the oil retaining recesses 20 are disposed on both sides of the recess 11a of the large end surface 11 of each tapered roller 4 (i.e., located across the recess 11a from each other), it is possible to prevent, while the tapered roller bearing 1 is stopped, the lubricating oil retained in the oil retaining recesses 20 of the cage from flowing into the recesses 11a of the large end surfaces 11 of the tapered rollers 4, and thereby to lubricate the large end surfaces 11 of the tapered rollers 4 (especially their annular surfaces 11b), while reducing wear between the tapered rollers 4 and the large flange 9 of the inner ring 3.

Also, in this tapered roller bearing 1, of the opening of each oil retaining recess 20 open to the large-diameter-side pocket surface 16, the area of its portion opposed to the large end surface 11 of the tapered roller 4 accounts for 50% or more (preferably 70% or more, more preferably 90% or more) of the area of the entire opening of the oil retaining recess 20 open to the large-diameter-side pocket surface 16. Therefore, most of the lubricating oil that flows out of each oil retaining recess 20 through the opening thereof open to the large-diameter-side pocket surface 16 can be efficiently adhered to the large end surface 11 of the tapered roller 4 (especially its annular surface 11b), thus making it possible to effectively lubricate the large end surfaces 11 of the tapered rollers 4.

Also, in this tapered roller bearing 1, since the inclination angles θ of the bottom surfaces 21 of the oil retaining recesses 20 are set at not more than 10 degrees, during rotation of the tapered roller bearing 1, the lubricating oil in the oil retaining recesses 20 smoothly flows out toward the large end surfaces 11 of the tapered rollers 4, and thus effectively lubricates the large end surfaces 11 of the tapered rollers 4. Also. since the inclination angles θ of the bottom surfaces 21 of the oil retaining recesses 20 are set to be larger than 0 degrees, preferably not less than 5 degrees, while the tapered roller bearing 1 is stopped, lubricating oil can be reliably retained in the oil retaining recesses 20.

Also, as described above, the cross-section of each oil retaining recess 20 orthogonal to the center axis of the cage 5 is quadrangular in shape, and the cross-section of the oil retaining recess 20 orthogonal to the radial direction is also quadrangular in shape, which means that a plurality of corners, i.e., the corners 26, 27 and 28, are formed on the inner wall of the oil retaining recess 20. Therefore, compared to an oil retaining recess having no corners 26, 27 and 28, such as an oil retaining recess of which the above cross-sectional shapes are circular shapes, a large surface tension acts between the inner surface of the oil retaining recess 20 and the lubricating oil. Therefore, surface tension effectively acts on the lubricating oil retained in the oil retaining recess 20, and thus the lubricating oil can be reliably retained in the oil retaining recess 20.

Also, in this tapered roller bearing 1, since the oil retaining recesses 20 are each located inside of the peripheral edge of the large end surface 11 of the corresponding tapered roller 4 so as not to protrude to the outside of the area opposed to the large end surface 11, it is possible, while the tapered roller bearing 1 is stopped, to effectively prevent the lubricating oil retained in the oil retaining recesses 20 from flowing out of the oil retaining recesses 20 through the outside of large end surface 11.

The above tapered roller bearing 1 can be assembled as follows: First, the tapered rollers 4 are inserted into the respective pockets 15 of the cage 5, and with the tapered rollers 4 received in the respective pockets 15 of the cage 5, the inner ring 3 is inserted into the cage 5. When inserting the inner ring 3, the tapered rollers 4 need to move over the small flange 8 of the inner ring 3. However, since the movements of the tapered rollers 4 in the radially outward direction are restricted by the cage 5, the tapered rollers 4 cannot move over the small flange 8 in the original-dimension relationship. In order to allow the tapered rollers 4 to move over the small flange 8, the cage 5 needs to be elastically deformed by the radially expanding forces which the tapered rollers 4 receive from the small flange 8 when the tapered rollers 4 move onto the small flange 8. In the above embodiment, since, as the resin composition forming the cage 5, a resin material to which an elastomer is added is used, the cage 5 has high elasticity. Therefore, it is possible to easily insert the inner ring 3 into the cage 5 with the tapered rollers 4 received in its respective pockets 15, and thus to easily assemble the tapered roller bearing 1.

Also, in this tapered roller bearing 1, since a resin material to which, in addition to an elastomer, a reinforcing fiber material is further added is used as the resin composition forming the cage 5, a reduction in toughness and strength of the cage 5 due to the addition of the elastomer is compensated for by the reinforcing fiber material added. Therefore, it is possible to realize both high toughness and strength of the cage 5 and ease of assembly of the tapered roller bearing 1.

FIGS. 6 to 10B illustrate a tapered roller bearing 1 according to the second embodiment of the present invention. The second embodiment are different from the first embodiment only in the structure of the oil retaining recesses 2, and the other elements of the second embodiment are identical in structure to those of the first embodiment. Therefore, the elements of the second embodiment corresponding (identical in structure) to those of the first embodiment are denoted by the same reference numerals, and their description is omitted.

Figure 9:
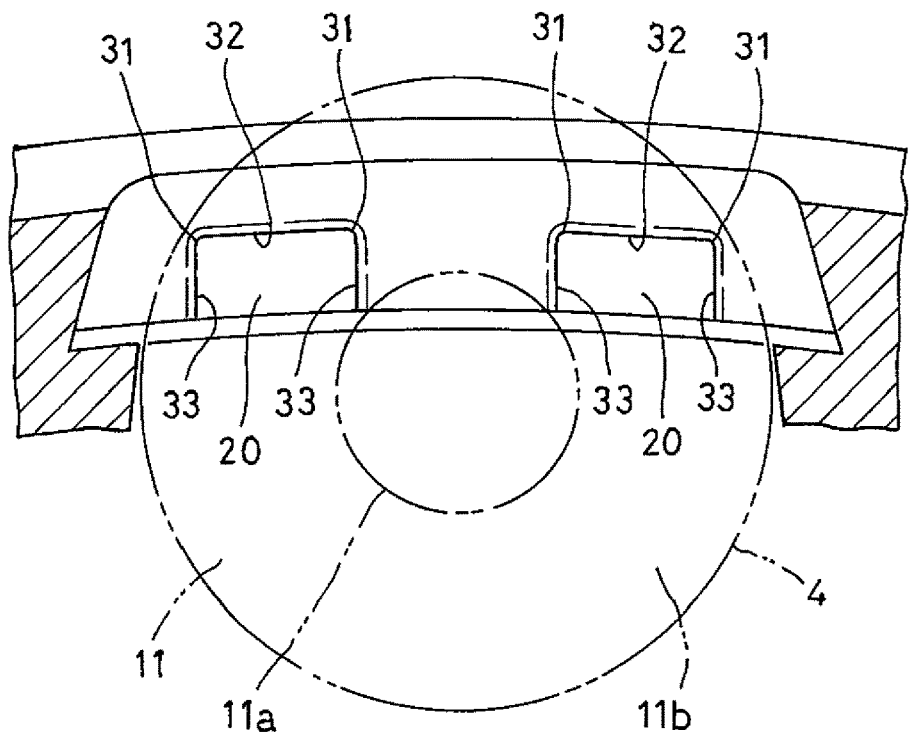
FIG. 9 is a partial sectional view of the large-diameter-side annular portion of the cage shown in FIG. 6 when seen from the side of the large end surface of a tapered roller.

As illustrated in FIG. 9, each oil retaining recess 20 has, when axially seen from the side of the roller large end surface 11, a quadrangular shape having two corners 31 where the adjacent inner surface portions of the oil retaining recess 20 intersect with each other.

Figure 6:
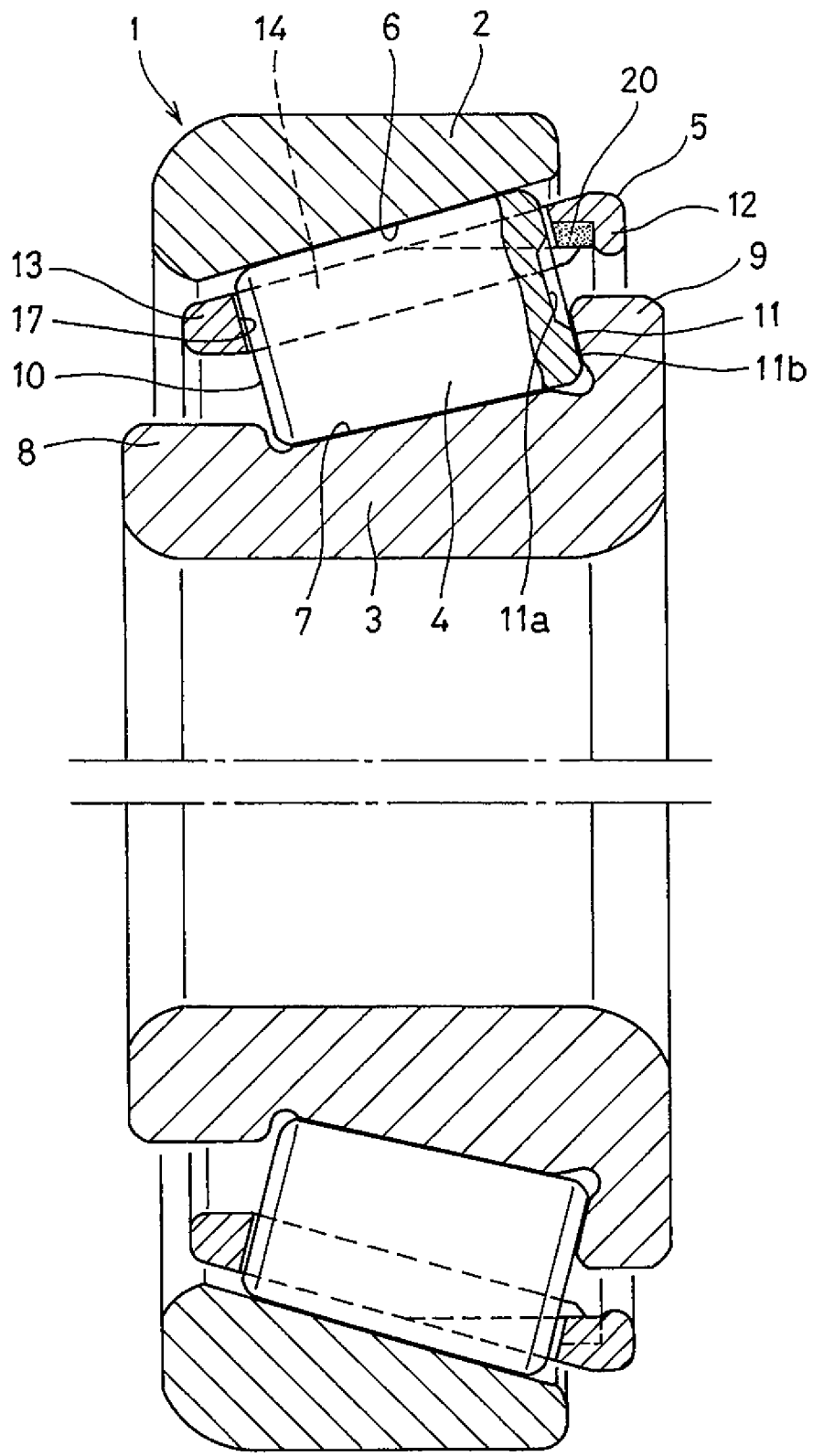
FIG. 6 is a sectional view of a tapered roller bearing according to the second embodiment of the present invention taken along an axial plane.
Figure 7:
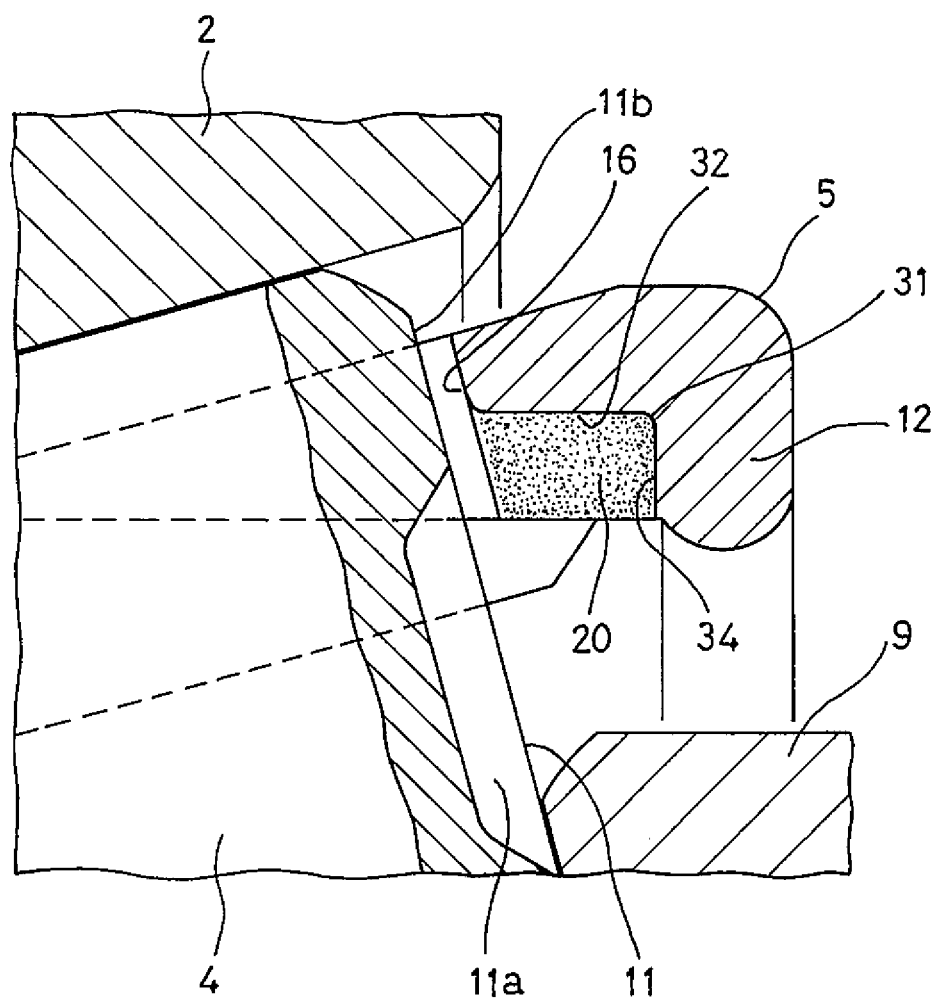
FIG. 7 is a partial enlarged view illustrating an oil retaining recess of FIG. 6 and its vicinity.
Figure 8:
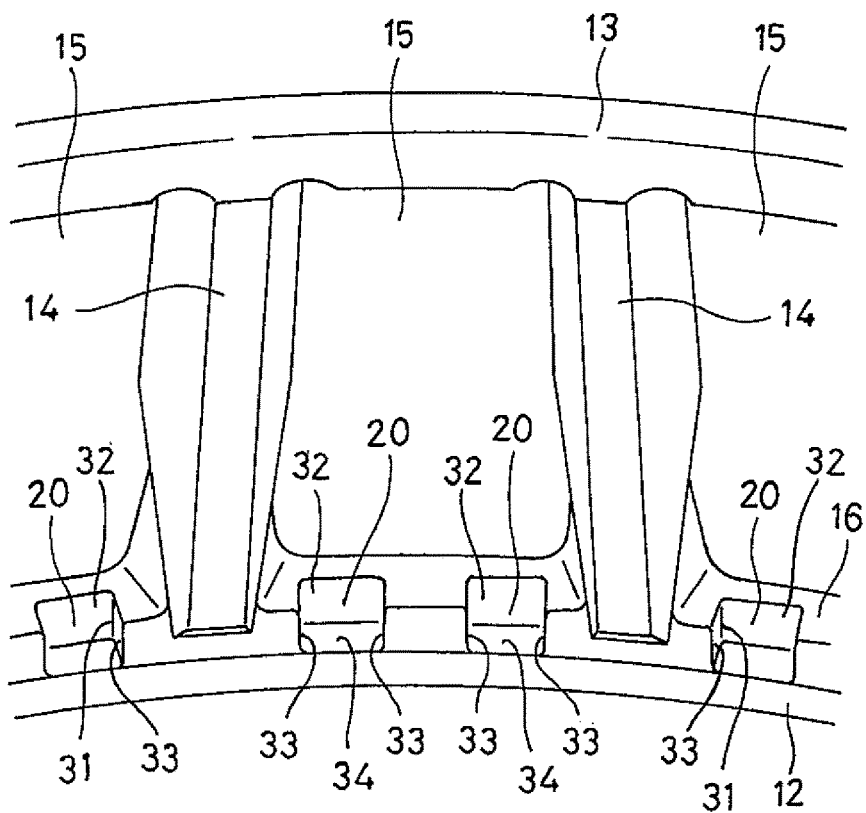
FIG. 8 is a partial sectional view of the cage of FIG. 6 when seen from the radially inner side thereof.

As illustrated in FIGS. 6 to 9, the inner surface of each oil retaining recess 20 comprises a bottom surface 32 facing radially inwardly of the cage; a pair of opposed surfaces 33 (rising surfaces) rising radially inwardly from the respective circumferential ends of the bottom surface 32; and an inner wall surface 34 located inside of the large-diameter-side annular portion 12, and into the large-diameter-side annular portion 12, in cross section of the tapered roller bearing 1 along an axial plane (i.e., cross section shown in FIGS. 6 and 7). The inner wall surface 34 is adjacent to the opposed surfaces 33 and the bottom surface 32. Corners 31 are formed between the bottom surface 32 and the inner wall surface 34; between the bottom surface 32 and each of the opposed surfaces 33; and between the inner wall surface 34 and each of the opposed surfaces 32. Each corner 31 is a rounded surface having a radius of curvature of 2.0 mm or less (preferably 1.0 mm or less, more preferably 0.3 mm or less, even more preferably 0.2 mm or less).

The depth of the oil retaining recess 20 (i.e., the width of the oil retaining recess 20 from its bottom surface 32 to the radially inner surface of the large-diameter-side annular portion 12) is 1.4 mm or less.

The lubricating oil in the oil retaining recess 20 receives, due to the surface tension of the lubricating oil, a force by which the lubricating oil is retained in the retaining recess 20 (this force is hereinafter referred to as "retaining force F1"). While the retaining force F1 is larger than gravity F2 applied to the lubricating oil, the lubricating oil is retained in the oil retaining recess 20. The retaining force F1 and the gravity F2 can be calculated by the following formulas:

Retaining force $F1$=surface tension of lubricating oil $\gamma \times$wet edge length $L$ (total value of the lengths of the inner surface portions of the oil retaining recess in contact with lubricating oil)$\times \cos \theta$ ($\theta$ is the contact angle of lubricating oil)

Gravity $F2$ applied to lubricating oil=gravity acceleration $g \times$density of lubricating oil $\rho \times$volume V of lubricating oil The wet edge length L is the total value of (i) the axial lengths of the areas of the opposed surfaces 33 in contact with the lubricating oil, and (ii) the circumferential length of the area of the inner wall surface 34 in contact with the lubricating oil.

If, for example, the surface tension of the lubricating oil γ is 30 (mN/m); the contact angle θ is 18.5°); the wet edge length L is 2.8 (mm); the density of the lubricating oil ρ is 0.85 (g/mm$^3$); and the volume V of the lubricating oil V is 0.49 (mm$^3$), then F1 will be $8.0 \times 10^{-5}$N, whereas F2 (gravity applied to lubricating oil) will be $4.0 \times 10^{-9}$N. Therefore, the relationship between F1 and F2 will be F1≥F2, so that the lubricating oil in the oil retaining recess is retained in the oil retaining recess by surface tension.

FIG. 16 shows a structural view of a portion of an automotive transmission 30 in which the above tapered roller bearing 1 is mounted.

Figure 11A:
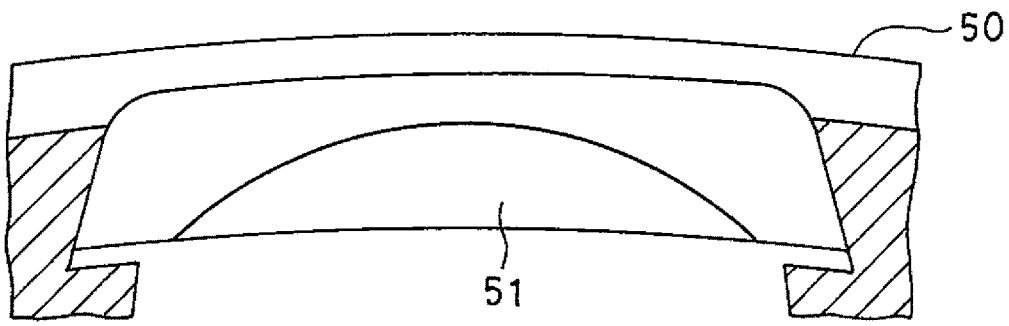
FIG. 11A is an enlarged view illustrating an oil retaining recess and its vicinity after a tapered roller bearing of a comparative example has been stopped for a long time.
Figure 11B:
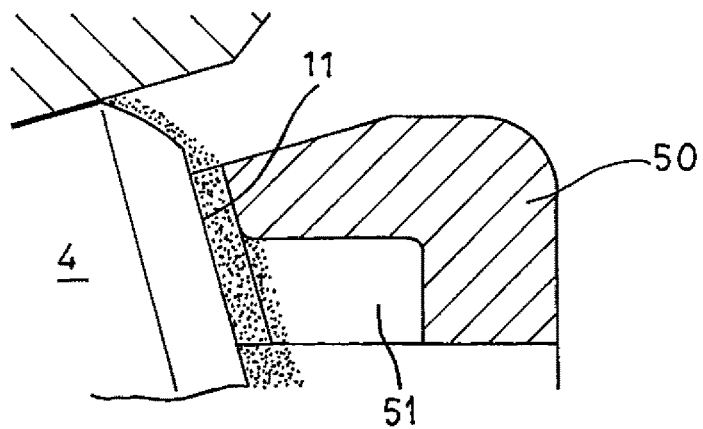
FIG. 11B is a sectional view of the oil retaining recess of FIG. 11A taken along a plane orthogonal to the circumferential direction of the cage.

Especially in recent years, in order to reduce energy loss caused by the stirring resistance of lubricating oil, there is a growing tendency to use low-viscosity lubricating oil, or reduce the amount of lubricating oil, in automotive transmissions and differential mechanisms. In this regard, since each oil retaining recess 51 of the cage 50 shown as a comparative example in FIG. 11A has, when axially seen, a bow shape having an inner surface composed of a single concave circular arc-shaped surface, and thus including no corners, lubricating oil is less likely to be retained in the oil retaining recess 51. Therefore, when the tapered roller bearing is stopped for a long time, lubricating oil flows out of the oil retaining recesses 51 as shown in FIG. 11B, and the amount of lubricating oil remaining in the tapered roller bearing tends to decrease to an insufficient level. As a result, when the tapered roller bearing is started thereafter, the temperature of the bearing between the large end surfaces of the tapered rollers and the large flange of the inner ring may rise sharply.

Figure 10A:
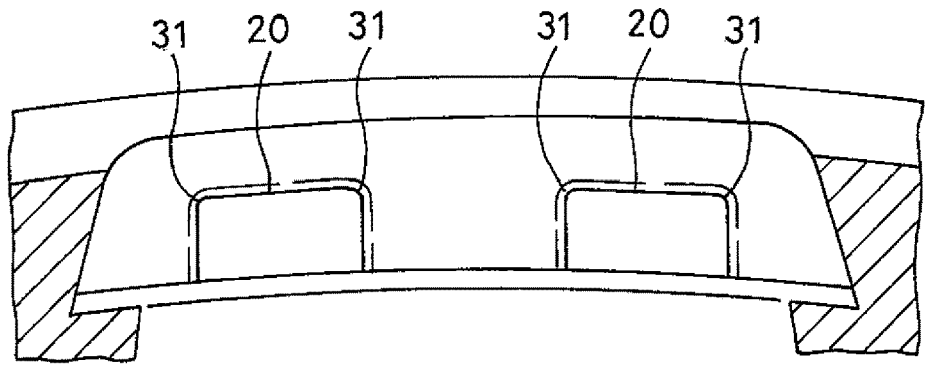
FIG. 10A is an enlarged view illustrating oil retaining recesses and their vicinities after the tapered roller bearing of FIG. 6 has been stopped for a long time.
Figure 10B:
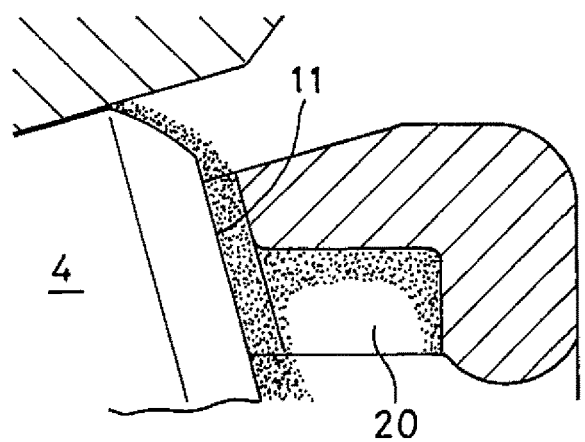
FIG. 10B is a sectional view of an oil retaining recess of FIG. 10A taken along a plane orthogonal to the circumferential direction of the cage.

The tapered roller bearing 1 of this embodiment overcomes this problem as follows: While the tapered roller bearing 1 is rotating, lubricating oil is introduced into the oil retaining recesses 20. As shown in FIG. 10A, each oil retaining recess 20 has, when axially seen, a quadrangular shape having two corners 31 where the adjacent inner surface portions of the oil retaining recess 20 intersect with each other. Since, at the corners 31 of the oil retaining recess 20, lubricating oil comes into contact with the adjacent inner surface portions of the oil retaining recess 20, it is possible to retain a larger amount of lubricating oil in the oil retaining recess 20 by the surface tension of the lubricating oil. Therefore, it is possible to reduce, while the bearing is stopped, the outflow of the lubricating oil in the oil retaining recesses 20 due to its own weight, and thereby to keep the lubricating oil in the oil retaining recesses 20 even when the bearing is stopped for a long time. When the tapered roller bearing 1 rotates thereafter, as shown in FIG. 10B, the lubricating oil in the oil retaining recesses 20 is moved toward the tapered rollers 4 by a centrifugal force, and lubricates the large end surfaces 11. This effectively prevents a sharp rise in the temperature of the bearing between the large end surfaces 11 of the tapered rollers 4 and the large flange 9 of the inner ring 3, when the tapered roller bearing 1 is started after being stopped for a long time.

When axially seen, each oil retaining recess 20 has two or more acute corners 31, where adjacent inner surface portions of the oil retaining recess 20 intersect with each other at an angle of not more than 90 degrees. At such acute corners 31, lubricating oil easily comes into contact with the adjacent surface portions. Therefore, at such acute corners 31, the contact area of the lubricating oil in the oil retaining recess 20 and the inner surface of the oil retaining recess 20 increases. This in turn increases the surface tension acting between the lubricating oil and the inner surface of the oil retaining recess 20, so that a large portion of the lubricating oil in the oil retaining recess 20 can be retained in the oil retaining recess 20.

Since the corners 31, where the adjacent inner surface portions of the oil retaining recess 20 intersect with each other, are rounded surfaces, it is possible to reduce stress concentration on the corners 31 during rotation of the bearing, and also to improve the formability of the oil retaining recesses 20. Further, since such rounded surfaces have a radius of curvature of preferably 1.0 mm or less, at least 2.0 mm or less, it is possible to more reliably reduce stress concentration on the corners 31 during rotation of the bearing.

Moreover, since a plurality of oil retaining recesses 20 are circumferentially arranged between each circumferentially adjacent pair of pillars 14, the total area of the inner surfaces of the oil retaining recesses 20 is larger than in an arrangement in which a single oil retaining recess is disposed between each circumferentially adjacent pair of pillars. This increases the contact area between the lubricating oil in the oil retaining recesses 20 and the inner surfaces of the oil retaining recesses 20, thereby increasing the surface tension acting between the inner surfaces of the oil retaining recesses 20 and the lubricating oil. Thus, a sufficient amount of lubricating oil can be retained in the oil retaining recesses 20.

Also, in this tapered roller bearing 1, since the oil retaining recesses 20 are disposed on both sides of the recess 11a of the large end surface 11 of each tapered roller 4 (i.e., located across the recess 11a from each other), while the tapered roller bearing 1 is stopped, it is possible to prevent the lubricating oil retained in the oil retaining recesses 20 of the cage from flowing into the recesses 11a of the large end surfaces 11 of the tapered rollers 4. Thus, it is possible to lubricate the large end surfaces 11 of the tapered rollers 4 (especially their annular surfaces 11b), while reducing the friction between the tapered rollers 4 and the large flange 9 of the inner ring 3.

Further, in this tapered roller bearing 1, of the portion of the opening of each oil retaining recess 20 open to the large-diameter-side pocket surface 16, the area of the portion opposed to the large end surface 11 of the tapered roller 4 accounts for 50% or more (preferably 70% or more, more preferably 90% or more) of the area of the entire portion of the opening of the oil retaining recess 20 open to the large-diameter-side pocket surface 16. Therefore, most of the lubricating oil that flows out of the oil retaining recess 20 through the opening thereof open to the large-diameter-side pocket surface 16 can be efficiently adhered to the large end surface 11 of the tapered roller 4 (especially its annular surface 11b), thus making it possible to effectively lubricate the large end surfaces 11 of the tapered rollers 4.

Moreover, in this tapered roller bearing 1, the oil retaining recesses 20 are preferably disposed inside of the peripheral edge of the large end surface 11 of each tapered roller 4 so as not to protrude to the outside of the area opposed to the large end surface 11. With this arrangement, while the tapered roller bearing 1 is stopped, the lubricating oil retained in the oil retaining recesses 20 can be efficiently supplied to the large end surfaces 11, and can effectively contribute to lubrication between the inner ring large flange and the roller large end surfaces.

In the embodiment, as polygonal oil recesses 20, i.e., recesses each having, when axially seen, two or more corners 31 where the adjacent inner surface portions of the oil retaining recess 20 intersect with each other, quadrangular oil retaining recesses 20 each having, when axially seen, two corners 31 are exemplified and described. However, as illustrated in FIG. 12, the oil retaining recesses 20 may instead have, when axially seen, a hexagonal shape including four corners 31 where the adjacent inner surface portions of the oil retaining recess 20 intersect with each other.

Figure 12:
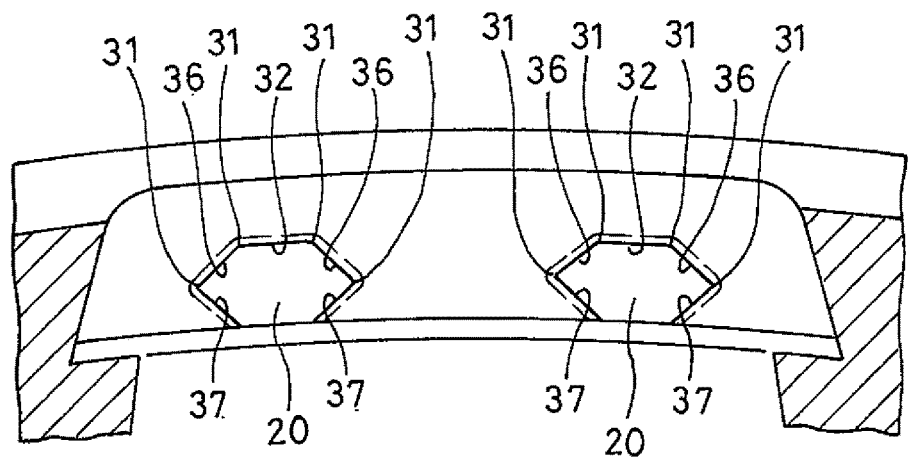
FIG. 12 is a view illustrating a variation of the oil retaining recesses of FIG. 9.

In FIG. 12, each oil retaining recess 20 has a hexagonal shape when seen from the side of the roller large end surface 11. Four corners 31 are defined, respectively, at portions of the oil retaining recess 20 where the adjacent inner surface portions of the oil retaining recess 20 intersect with each other. The hexagonal oil retaining recess 20 has a bottom surface 32 facing radially inwardly of the cage; first surfaces 36 intersecting with the respective ends, in the circumferential direction of the cage, of the bottom surface 32; and second surfaces 37 intersecting with ends of the respective first surfaces 36, and extending to the opening of the oil retaining recess 20 at the large-diameter-side pocket surface 16. The internal angles of the corners 31 between the bottom surface 32 and the respective first surfaces 36 are 90 degrees or more. The internal angles of the corners 31 between the first surfaces 36 and the respective second surfaces 37 are right angles or acute angles or less than 90 degrees. Because the corners 31 of an oil retaining recess 20 having a hexagonal shape when axially seen are larger in number than those of an oil retaining recess 20 having a quadrangular shape when axially seen, such a hexagonal oil retaining recess 20 is capable of retaining lubricating oil more effectively.

Figure 13:
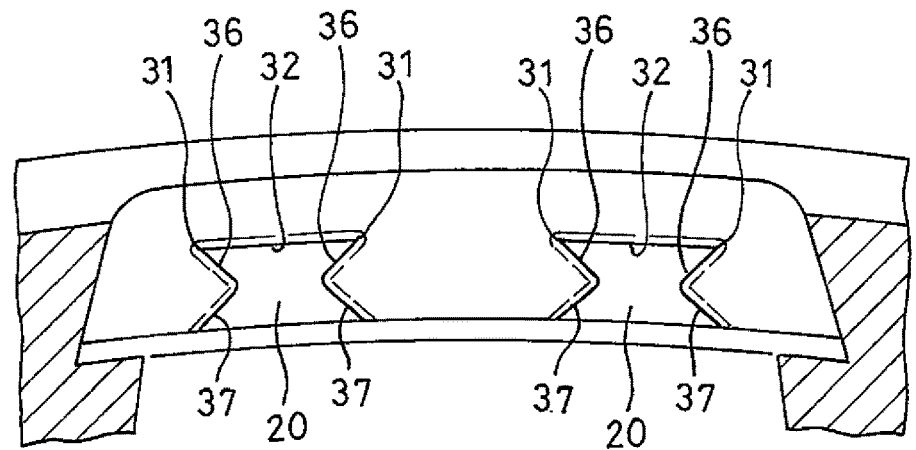
FIG. 13 is a view illustrating a different variation of the oil retaining recesses of FIG. 9.

Also, as illustrated in FIG. 13, the hexagonal oil retaining recesses 20 may have a hexagonal shape of which the internal angles of the corners between the bottom surface 32 and the respective first surfaces 36 are acute angles or less than 90 degrees, and the external angles of the ridges between the first surfaces 36 and the respective second surfaces 37 are obtuse angles of more than 180 degrees.

Figure 14:
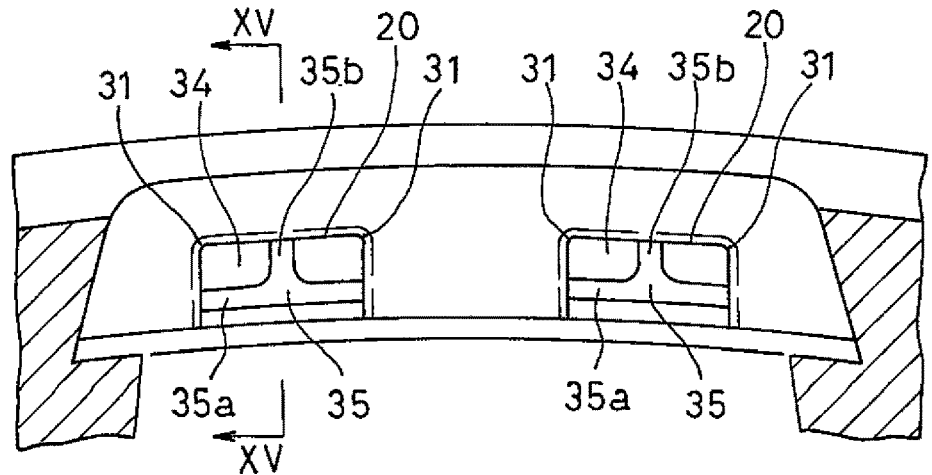
FIG. 14 is a view illustrating a still different variation of the oil retaining recesses of FIG. 9.
Figure 15:
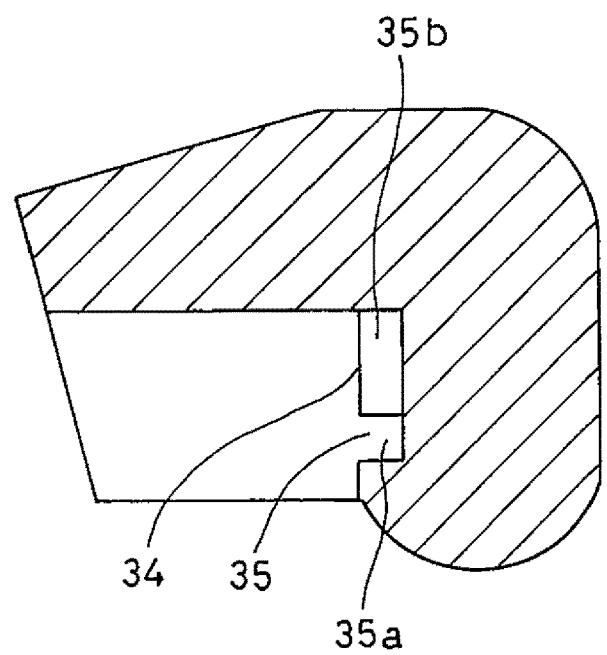
FIG. 15 is a sectional view taken along line XV-XV line of FIG. 14.

As illustrated in FIGS. 14 and 15, an axially (horizontally in FIG. 15) recessed oil retaining groove 35 may be formed in the inner wall surface 34 of each oil retaining recess 20. The oil retaining groove 35 is located radially outwardly spaced apart from the inner peripheral surface of the large-diameter-side annular portion 12 so as not to open to the inner peripheral surface of the large-diameter-side annular portion 12. The oil retaining groove 35 has an axial (horizontal in FIG. 15) depth of 1.0 mm or less (preferably 0.5 mm or less).

The oil retaining groove 35 includes a horizontal groove portion 35a extending from one of the opposite circumferential sides (right and left sides in FIG. 14) to the other circumferential side; and a vertical groove portion 35b branching off and extending radially outwardly from an intermediate section of the horizontal groove portion 35a. The horizontal groove portion 35a has a radial (vertical in FIG. 14) width of 0.1 to 1.0 mm (preferably 0.2 to 0.8 mm, more preferably 0.4 to 0.6 mm). The vertical groove portion 35b has a circumferential width of 0.1 to 1.0 mm (preferably 0.2 to 0.8 mm, more preferably 0.4 to 0.6 mm).

By forming, as illustrated in FIGS. 14 and 15, the axially recessed oil retaining grooves 35 in the inner wall surfaces 34 of the respective oil retaining recesses 20, the lubricating oil in the oil retaining recesses 20 enter the oil retaining grooves 35, and can be easily retained in the oil retaining recesses 20. Therefore, the lubricating oil in the oil retaining recesses 20 can suitably lubricate the roller large end surfaces 11 during rotation of the tapered roller bearing 1, and can be suitably retained in the oil retaining recesses 20 while the tapered roller bearing 1 is stopped.

Also, since the oil retaining grooves 35 are each radially outwardly spaced apart from the inner peripheral surface of the large-diameter-side annular portion 12 so as not to open to the inner peripheral surface of the large-diameter-side annular portion 12, lubricating oil in the oil retaining recesses 20 located at a higher level than the rotational center axis of the tapered roller bearing 1 is suitably retained in the oil retaining grooves 35. In other words, for the oil retaining recesses 20 located at a higher level than the above rotational center axis, while gravity (force in the downward direction toward the inner peripheral surface of the large-diameter-side annular portion 12) is applied to the lubricating oil therein, since the oil retaining grooves 35 of the oil retaining recesses 20 do not open to the inner peripheral surface of the large-diameter-side annular portion 12, the lubricating oil in the oil retaining grooves 35 does not easily flow out of the oil retaining grooves 35 due to its own weight. Therefore, the lubricating oil in the oil retaining recesses 20 can be suitably retained in the oil retaining recesses 20 by the oil retaining grooves 35.

Also, the oil retaining groove 35 includes a horizontal groove portion 35a extending from one of the opposite circumferential sides to the other circumferential side; and a vertical groove portion 35b branching off and extending radially outwardly from an intermediate section of the horizontal groove portion 35a, and this increases the surface area of the inner surface of the oil retaining groove 35, thus increasing the contact area between the lubricating oil in the oil retaining recess 20 and the inner surface of the oil retaining groove 35. As a result, a larger surface tension acts between the lubricating oil in the oil retaining groove, and the inner surface of the oil retaining groove 35. Therefore, the lubricating oil in the oil retaining recess 20 can be retained more suitably in the oil retaining recess 20.

Figure 17:
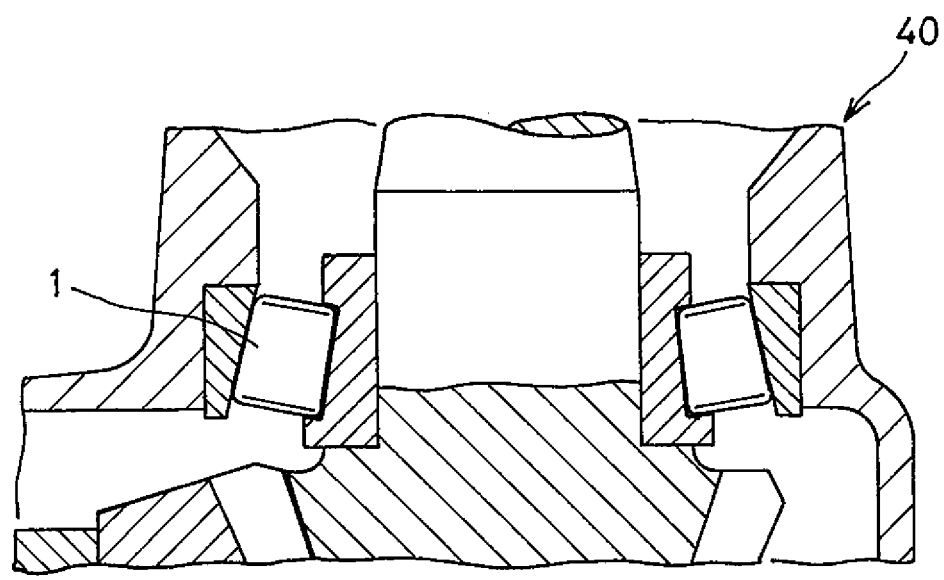
FIG. 17 is a view of a differential mechanism in which the tapered roller bearing of FIG. 1

The above tapered roller bearing 1 can be used as a rolling bearing that rotatably supports an input shaft of the differential mechanism 40 of FIG. 17.

While the embodiments of the present invention were described above, the scope of the present invention is not limited to the above-described embodiments, and can be applied to various modifications.

While, in each of the above embodiments, as illustrated in FIGS. 2, 4 and 5 or FIG. 8, two oil retaining recesses 20 are disposed per large-diameter-side pocket surface 16, a single oil retaining recess 20, or three or more oil retaining recesses 20 may be disposed per large-diameter-side pocket surface 16. Alternatively, different numbers of oil retaining recesses 20 may be disposed for the respective large-diameter-side pocket surface 16.

The above-described embodiments are mere examples in every respect, and the present invention is not limited thereto. Therefore, the scope of the present invention is indicated not by the above description but by the claims, and should be understood to include all modifications within the scope and meaning equivalent to the scope of the claims.

The invention claimed is:

1. A tapered roller bearing comprising:
   an outer ring;
   an inner ring arranged inwardly of, and coaxially with, the outer ring;
   a plurality of tapered rollers each having a large end surface and a small end surface, and disposed between the outer ring and the inner ring so as to be circumferentially spaced apart from each other; and
   an annular cage keeping circumferential distances between the tapered rollers,
   wherein the inner ring includes a large flange configured to come into contact with the large end surfaces of the tapered rollers,
   wherein the annular cage includes:
      a large-diameter-side annular portion circumferentially extending along the large end surfaces of the tapered rollers;
      a small-diameter-side annular portion circumferentially extending along the small end surfaces of the tapered rollers; and
      a plurality of pillars coupling together the large-diameter-side annular portion and the small-diameter-side annular portion,
   wherein the large-diameter-side annular portion, the small-diameter-side annular portion, and the pillars define a plurality of pockets in which the respective tapered rollers are received, wherein the large-diameter-side annular portion includes:
large-diameter-side pocket surfaces opposed to the large end surfaces of the respective tapered rollers; and
oil retaining recesses each having an opening spanning an inner peripheral surface of the large-diameter-side annular portion and a respective one of the large-diameter-side pocket surfaces,
wherein each of the oil retaining recesses has an inner surface having a radially inwardly facing surface portion, the radially inwardly facing portion being an inclined surface which is radially inwardly inclined toward a corresponding one of the tapered rollers.

2. The tapered roller bearing according to claim 1, wherein the radially inwardly facing surface portion of each of the oil retaining recesses is inclined at an inclination angle of 10 degrees or less relative to a direction parallel to a center axis of the annular cage.

3. The tapered roller bearing according to claim 1, wherein a cross-sectional shape of each of the oil retaining recesses orthogonal to a center axis of the annular cage is a quadrangular shape.

4. The tapered roller bearing according to claim 1, wherein two or more of the oil retaining recesses are circumferentially arranged between each circumferentially adjacent pair of the pillars.

5. The tapered roller bearing according to claim 1, wherein each of the tapered rollers has a recess in the large end surface thereof, and
wherein oil retaining recesses are disposed on both sides of the recess of the corresponding one of the tapered rollers.

6. The tapered roller bearing according to claim 1, wherein, when axially seen, at least 50% of the opening of each of the oil retaining recesses overlaps with the large end surface of the corresponding one of the tapered rollers.

7. The tapered roller bearing according to claim 1, wherein each of the oil retaining recesses is located inside of a peripheral edge of the large end surface of the corresponding one of the tapered rollers so as not to protrude outside of an area opposed to the large end surface of the corresponding one of the tapered rollers.

8. The tapered roller bearing according to claim 1, wherein the inner ring includes a small flange opposed to the small end surfaces of the tapered rollers, and
wherein the annular cage is integrally formed of a resin composition comprising a resin material and an elastomer.

9. The tapered roller bearing according claim 8, wherein the resin composition further comprises a reinforcing fiber material.

10. A tapered roller bearing comprising:
an outer ring;
an inner ring arranged inwardly of, and coaxially with, the outer ring;
a plurality of tapered rollers each having a large end surface and a small end surface, and disposed between the outer ring and the inner ring so as to be circumferentially spaced apart from each other; and
an annular cage keeping circumferential distances between the tapered rollers,
wherein the inner ring includes a large flange configured to come into contact with the large end surfaces of the tapered rollers,
wherein the annular cage includes:
a large-diameter-side annular portion circumferentially extending along the large end surfaces of the tapered rollers;
a small-diameter-side annular portion circumferentially extending along the small end surfaces of the tapered rollers; and
a plurality of pillars coupling together the large-diameter-side annular portion and the small-diameter-side annular portion,
wherein the large-diameter-side annular portion, the small-diameter-side annular portion, and the pillars define a plurality of pockets in which the respective tapered rollers are received,
wherein the large-diameter-side annular portion includes:
large-diameter-side pocket surfaces opposed to the large end surfaces of the respective tapered rollers; and
oil retaining recesses each having an opening spanning an inner peripheral surface of the large-diameter-side annular portion and a respective one of the large-diameter-side pocket surfaces,
wherein, when axially seen, each of the oil retaining recesses has a polygonal shape having two or more corners where adjacent inner surface portions of the oil retaining recess intersect with each other.

11. The tapered roller bearing according to claim 10, wherein each of the oil retaining recesses has an inner wall surface, and wherein the inner wall surface includes an axially recessed oil retaining groove.

12. The tapered roller bearing according to claim 11, wherein the axially recessed oil retaining groove of each of the oil retaining recesses is radially outwardly spaced apart from the inner peripheral surface of the large-diameter-side annular portion so as not to open to the inner peripheral surface of the large-diameter-side annular portion.

13. The tapered roller bearing according to claim 11, wherein the axially recessed oil retaining groove of each of the oil retaining recesses comprises:
a horizontal groove portion extending from a first of two opposite circumferential sides to a second of the two opposite circumferential sides; and
a vertical groove portion branching off and extending radially outwardly from an intermediate section of the horizontal groove portion.

14. The tapered roller bearing according to claim 10, wherein, the two or more corners of the polygonal shape of each of the oil retaining recesses include two or more acute corners.

15. The tapered roller bearing according to claim 10, wherein, in each of the oil retaining recesses, the adjacent inner surface portions of the oil retaining recess intersect with each other via a rounded surface having a radius of curvature of 2.0 mm or less.

16. The tapered roller bearing according to claim 10, wherein two or more of the oil retaining recesses are circumferentially arranged between each circumferentially adjacent pair of the pillars.

17. The tapered roller bearing according to claim 10, wherein each of the tapered rollers has a recess in the large end surface thereof, and
wherein the oil retaining recesses are disposed on both sides of the recess of a corresponding one of the tapered rollers.

18. The tapered roller bearing according to claim 10, wherein, when axially seen, at least 50% of the opening of each of the oil retaining recesses overlaps with the large end surface of a corresponding one of the tapered rollers.

19. The tapered roller bearing according to claim 10, wherein each of the oil retaining recesses is located inside of a peripheral edge of the large end surface of a corresponding one of the tapered rollers so as not to protrude outside of an area opposed to the large end surface of the corresponding one of the tapered rollers.

20. The tapered roller bearing according to claim 10, wherein the inner ring includes a small flange opposed to the small end surfaces of the tapered rollers, and
   wherein the annular cage is integrally formed of a resin composition comprising a resin material and an elastomer.

* * * * *